June 7, 1955 W. J. HUGHES 2,710,126
LIQUID FILLING DEVICE
Filed March 14, 1950 10 Sheets-Sheet 1

INVENTOR.
Walter J. Hughes
BY
Agent

June 7, 1955 W. J. HUGHES 2,710,126
LIQUID FILLING DEVICE
Filed March 14, 1950 10 Sheets-Sheet 3

Fig. 5.

INVENTOR.
Walter J. Hughes
BY
Agent.

June 7, 1955     W. J. HUGHES     2,710,126
LIQUID FILLING DEVICE

Filed March 14, 1950     10 Sheets-Sheet 7

INVENTOR.
Walter J. Hughes

United States Patent Office 2,710,126
Patented June 7, 1955

2,710,126

LIQUID FILLING DEVICE

Walter J. Hughes, Chicago, Ill., assignor to Infilco Incorporated, Chicago, Ill., a corporation of Delaware Application March 14, 1950, Serial No. 149,629

10 Claims. (Cl. 226—93)

This invention relates to a device for filling in unison a bank of containers, such as cans, and more particularly to such a device which is capable of filling the containers from the bottom.

It is an object of this invention to provide an apparatus for filling in unison and from the bottom a bank of containers, comprising any desired number.

Another object is to provide a device for simultaneously filling a bank of containers in such manner as to prevent entrainment of air.

Another object is to provide an ice can filling device constructed in such manner as to be suitable for delivering degasified water to the cans without entrainment of air in the degasified water during filling or between filling operations.

Another object is a device for filling in unison a bank of containers which, after its operation has been started, completes automatically a cycle of operations.

Another object is to provide a bank of filler tubes which are swingable in unison between a filling and a non-filling position and means for synchronizing the movement of the tubes.

Another object is to provide a bank of filler tubes swingable from filling to non-filling position which will deliver exact and equal amounts of liquid to each container in a bank of containers to be filled.

Another object is to provide a filling device for filling in unison a bank of liquid containers from the bottom, the filling operation being stopped simultaneously for all containers by a single controller operable from the liquid level in one container.

Another object is to provide a header supporting and supplying a bank of filler tubes and movable from a filling to a non-filling position with its center line parallel in all positions to that in filling position.

Another object is to provide a swingable header supporting and supplying a bank of filler tubes, drive means applied at one end of the header and a torsion member associated with the header and synchronizing the movements of the two ends of the header.

Another object is an ice can filler provided with a bank of filler tubes movable from a filling to a non-filling position and liquid level controlled means operable to automatically start motion from filling to non-filling position and to simultaneously stop flow from the tubes.

Other objects will become apparent from a consideration of the specification and claims.

The apparatus of this invention is useful wherever it is desirable or necessary to fill a multiplicity of containers in unison with a liquid from the bottom, be it to avoid entraining of air or merely splashing or the like. Primarily, however, the apparatus is designed for use in the ice making industry and has particular utility in the handling of degasified water so that during filling of the ice cans there is little or no exposure of the degasified water to atmospheric air. The invention will, therefore, be described herein for purposes of illustration but not of limitation, as applied to an ice can filling device.

It is usual in the ice making industry to handle a bank of cans simultaneously. The cans are usually brought by a suitable overhead trolley crane to a dumping device where a number of cans, lifted in a bank, can be filled in unison or dumped in unison. Once filled, the cans are transported to their place in the freezing brine tank where they are lowered into place and left immersed in circulated freezing brine. When the water is frozen, the cans are lifted from their place in the brine tank and taken to a hot water tank where the bank of cans is immersed in hot water to thaw the outside of the ice blocks from the inside walls of the cans. The bank of cans is then hoisted and transported to the dumping device into which the bank of cans is set. The dump rack tips the entire bank of cans over on its side such that the ice blocks slide out and run off in a suitable chute to a storage room or loading platform. The empty bank of cans is tipped to an upright position and refilled with water after which the trolley crane again picks up the bank of filled cans and transports them to their place in the brine tank.

The procedure briefly outlined above is applied quite generally to the making of raw water ice. In this industry, the bank of cans is usually filled from an overhead bank of tanks which are filled to a common measuring level by a float controlled supply valve. Each of the tanks has an outlet that empties its contents into one of the ice cans and in this manner the bank of cans is filled to a common and properly controlled content, such that by volume measure all of the cans are filled alike and the resulting ice blocks are of substantially the same weight. The outlets of the tanks are valved and the bank of valves is operated by a common lever.

This method of filling the cans permits the water to fall into them through the air and there is, therefore, a considerable amount of aeration of the water. This is permissible in the conventional raw water ice manufacture where the water in the freezing cans is continuously agitated during the freezing process by bubbling air through the freezing water. Obviously in such a process it does not matter that some air is entrained in the water during filling of the ice cans.

More recently it has been discovered that water that has been previously demineralized and degasified, can be frozen into clear ice under quiescent conditions. The new process of quiescent freezing of demineralized and degasified water permits freezing at lower temperatures than heretofore usual in raw ice manufacture. It further eliminates the expensive apparatus previously used for, and in connection with, air agitation, including the air compressing, cleaning, drying and cooling machinery, and the considerable cost for maintenance of such equipment. However, the new process necessitates the substantial exclusion of contact of the previously degasified water with air in transferring it from the degasifier to the freezing cans. The usual can filling devices, described above are unsuitable for this purpose.

The filling of containers from the bottom is a well known means for preventing splashing and entrainment of air. However, to adapt this principle to a multiple can filler involved many difficulties and problems.

To fill a bank of ice cans simultaneously from the bottom with equal quantities of liquid, it is necessary to provide a bank of filling tubes that are swingable in unison into the cans so that their lower ends are adjacent the bottom of the cans in filling position, and that are retractable from the cans to a non-filling position where all operating parts of the filling device must be clear of the path needed for lifting the cans, setting them in place in the dump and dumping the cans and ice blocks.

The number of filling tubes in a bank may have to be anything from 4 to 8 in a small ice plant to 24 to 30 or more in larger plants. The length of the swingable support for the tubes thus may have to be up to 35 feet or more. At any length involved, even for a few cans, there is a problem of swinging the two ends of the support without angular displacement or distortion. The problem is made somewhat more difficult by the fact that in ice plants the drive for swinging the tubes can usually be applied at only one end of the bank of tubes because of lack of space.

My invention will be understood more fully by reference to the detailed description which follows and to the drawings wherein like reference characters designate similar elements and wherein.

Figure 1:
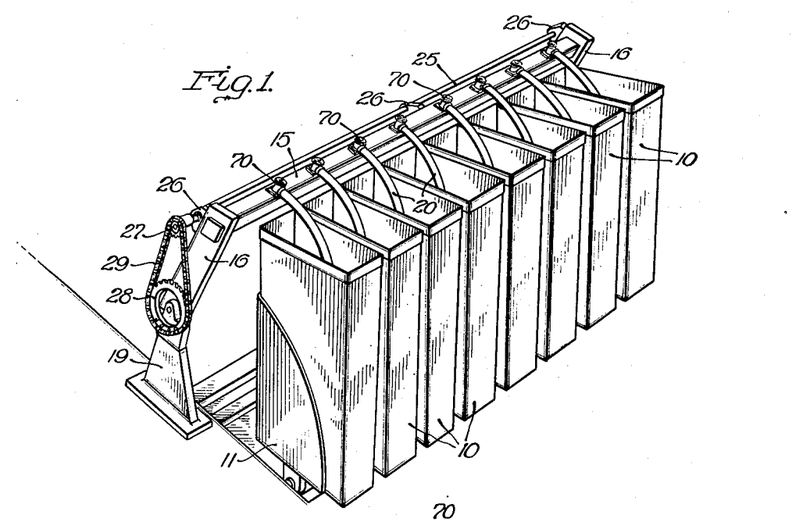
Figure 1 is a perspective view of a filling device according to the invention showing the device in its filling position.

Referring now to the figures in detail, Figure 1 shows a bank of cans 10, such as are generally used in ice plants, supported in upright position on a conventional dumping device 11. While eight cans are shown for purposes of illustration, far greater numbers are frequently assembled in a bank in large ice plants and can be served in unison by the filler. The cans are spaced from each other sufficiently to leave a brine circulating space therebetween. A header 15, corresponding in length to the length of the bank of cans to be filled, is swingably supported at each end thereof by an arm 16 fitted with a stub shaft 17. (See Figure 7.) Each shaft 17 is journaled in a bearing 18 supported by a base 19. A plurality of filler tubes 20, corresponding in number to the number of cans to be filled, are supported by and receive liquid from the header 15. In Figure 1 the header and tubes are shown in the filling position, wherein the header is swung forwardly and the tubes extend into the cans.

Figure 2:
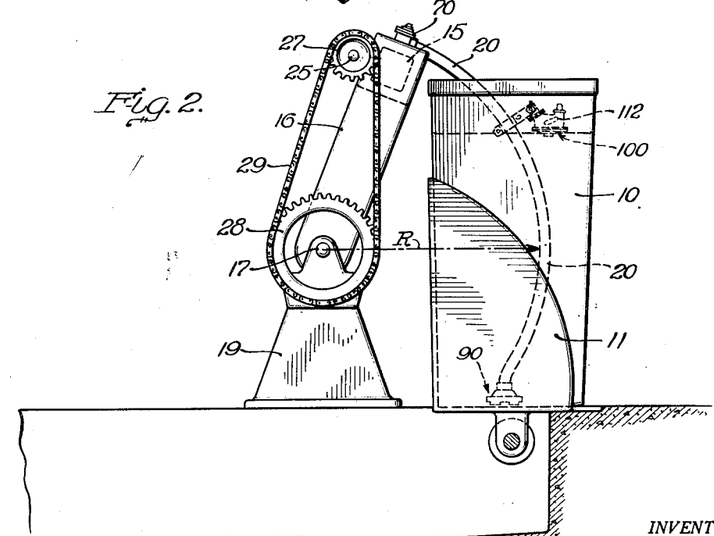
Figures 2 and 3 illustrate diagrammatically the path through which a filling device according to the invention is moved from its filling position (Figure 2) to its non-filling position (Figure 3) and the clearances provided between the filler in non-filling position and the dumping path of the cans and ice blocks.
Figure 3:
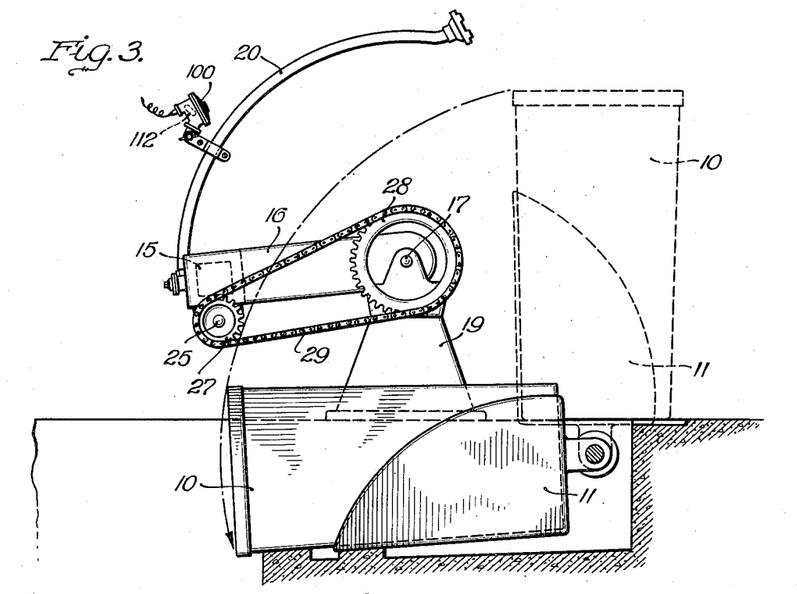

Figures 2 and 3 illustrate diagrammatically the filling device in its filling and non-filling positions and the ice cans in their filling and dumping positions, respectively, and serve primarily to indicate the geometry of the filling device and the clearances that must be provided between the filler in retracted position and the dumping path of the cans and ice blocks. While the cans and the dumping device do not form a part of this invention, the filling device, when used as an ice can filler, must cooperate with this type of standard equipment of present day ice plants. The header 15 is shown in these figures supported from and swingable about its center of rotation 17. The filler tube 20 is supported by and connected to the header and is formed to a radius R about the center 17. The position in Figure 2 corresponds to that of Figure 1, the can 10 being upright on the dump 11 and the valved lower end of the filler pipe being at the bottom of the can. In Figure 3 the device has been swung around the center 17 to a position where the valved end of the filler pipe 20 clears the upper rim of the can 10 and the header clears the dumping path of the can.

Figure 4:
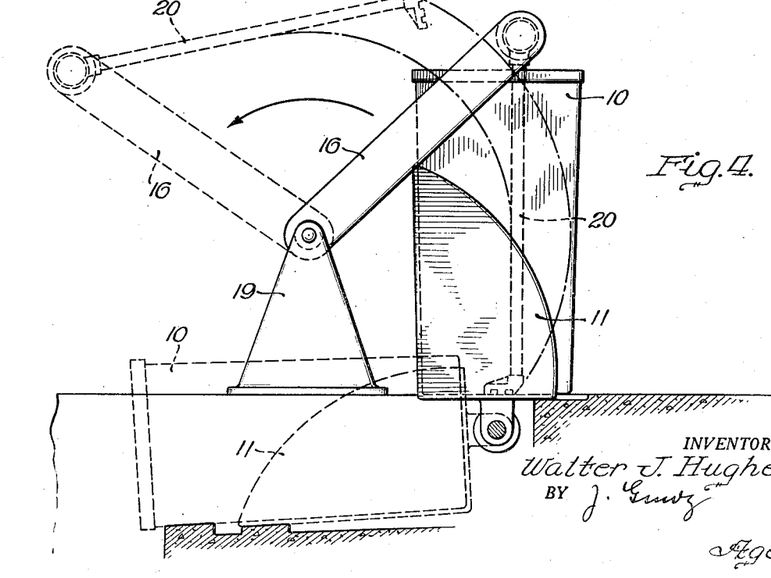
Figure 4 shows diagrammatically the path from filling to non-filling position of a filling device according to the invention utilizing straight filler tubes.

While the filler tubes 20 are shown curved in Figures 1, 2 and 3, straight tubes can be used with advantage where sufficient space is available. This is illustrated in Figure 4 which shows diagrammatically a filling device with straight filler tubes in the two end positions corresponding to Figures 2 and 3, and the path described by the tubes in moving from one position to the other.

The header 15 and arms 16 form a crank like support for the several filler tubes 20. The length of the header 15 is considerable even for only a few cans and may be anything up to thirty-five feet or more in large ice plants. The header can be supported only at its ends due to the necessity of dumping the ice cans and blocks. At any length, even for a few cans, the problem arises of swinging the two ends of the header together without angular displacement or distortion. Obviously, the longer the header the greater the tendency of distortion. To synchronize the movement of the two ends of the header and prevent twisting and distortion I use a torsional synchronizing device whose essential member is a torsion shaft 25. The torsion shaft 25 is connected to the header 15 in such manner that when the driving force is applied to the header to swing it from one of its end positions to the other, the torsion shaft is rotated through a corresponding angle, or vice versa, when the driving force is applied to the torsion shaft 25 to rotate it through a predetermined angular distance, the header 15 will travel from one of its end positions to the other. In the embodiment of the invention shown in Figures 6, 7 and 8 of the drawings the driving force is applied to one of the arms 16 supporting the header 15, and the motion of the arm is transmitted to the torsion shaft 25. However, as will be explained in connection with Figure 15, this relation can be reversed and drive force can be applied to the torsion shaft and be transmitted to the arms supporting the header. Thus the shaft 25 can serve either as torsion member alone or as a driving and torsion member.

Figure 15:
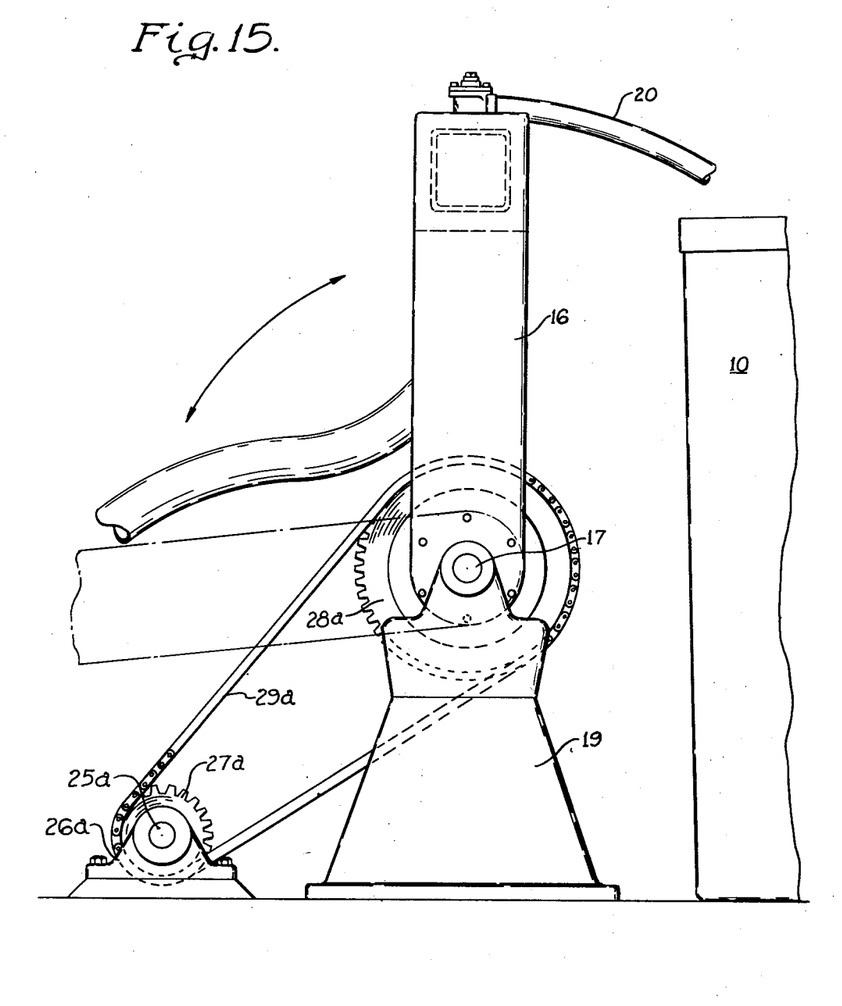
Figure 15 is an end view of a modified embodiment of the invention.

In the embodiment 6 shown in Figures 1, 6, 7 and 8 the torsion shaft 25 is carried in bearings 26 mounted on the arms 16. Any suitable means may be used for transmitting the motion of the arms 16 to the torsion shaft 25 or vice versa. For purposes of illustration I show a chain drive connection. To each end of the shaft 25 a small sprocket 27 is keyed and to each of the bases 19 a larger sprocket 28 is secured in such manner that it cannot rotate. A chain 29 runs over each pair of sprockets 27 and 28 at each end of the filling device. Thus, when the header 15 is swung from one of its end positions to the other, such as from filling to non-filling position, the shaft 25 will be rotated in its bearings 26 by an amount depending upon the angular travel of the arms 16 and the ratio of the diameters of the sprockets 27 and 28. Since the ratio between the diameters of the sprockets 27 and 28 is constant in any given machine, though it may be selected to fit any given set of conditions, the angular motion of the shaft is proportional to the angular motion of the header. The shaft 25 is made heavy enough to withstand any torsional stresses set up by the unbalanced weight of the header 15 and the attached members, as the header is swung from position to position.

Where sufficient space is available the torsion shaft 25 with its sprockets 27 need not be mounted on the arms 16 and header 15 as shown, but can be mounted separately in any suitable manner. One manner of mounting the torsion shaft separately is shown in Figure 15. In this figure, the torsion shaft 25a, instead of being mounted on the header, is supported in stationary bearings 26a, small sprockets 27a being keyed to each of its ends. The large sprockets 28a, instead of being secured to the bases 19 and prevented from turning, are secured to the arms 16. A chain 29a runs over each pair of sprockets 27a and 28a. In this embodiment, obviously, the driving force can be applied to the shaft 25a or to one of the arms 16 as desired. Such separate mounting of the torsion shaft is particularly contemplated for such cases where the containers to be filled by the device need not be dumped so that the space in the rear of the device is available. In ice plants it will in most cases be preferable to mount the shaft 25 on the arms 16 and thus out of the way of the dumping path of the cans.

Any suitable means may be used for moving the header 15. For purposes of exemplification I show in Figure 6 a hydraulic cylinder 30 whose piston, not shown, and piston rod 31 drive a rack 32 whose teeth mesh with a gear segment 33. The segment 33 is attached as by screws 34 to the arm 16 which is centered and carried by the stub shaft 17. The hydraulic cylinder 30 is connected to a source of water under pressure, such as to a city supply, by an inlet conduit 35, which connects through a T 36 to each of two solenoid operated three-way pilot valves 37 and 37a. A regulating cock 38 may be provided in each of the supply lines leading from the T 36 for regulating the rate of swing of the header 15. The valves 37 and 37a have connections 39 to the opposite ends of the cylinder 30 and each has a waste connection 40. Solenoids 45 and 45a controlling the valves 37 and 37a, respectively, are electrically connected in such manner that when either solenoid is energized the waste connection 40 of its associated valve closes and the respective connection 39 to the cylinder opens to admit pressure water to the respective end of the hydraulic cylinder, and conversely, when a solenoid is deenergized the respective pressure water connection closes and the waste connection opens to relieve pressure from the respective end of the hydraulic cylinder. By alternately energizing the solenoids 45 and 45a the rack 32 will be moved in opposite directions to turn the segment 33 and swing the header 15 from filling to non-filling position and vice versa.

Figure 5:
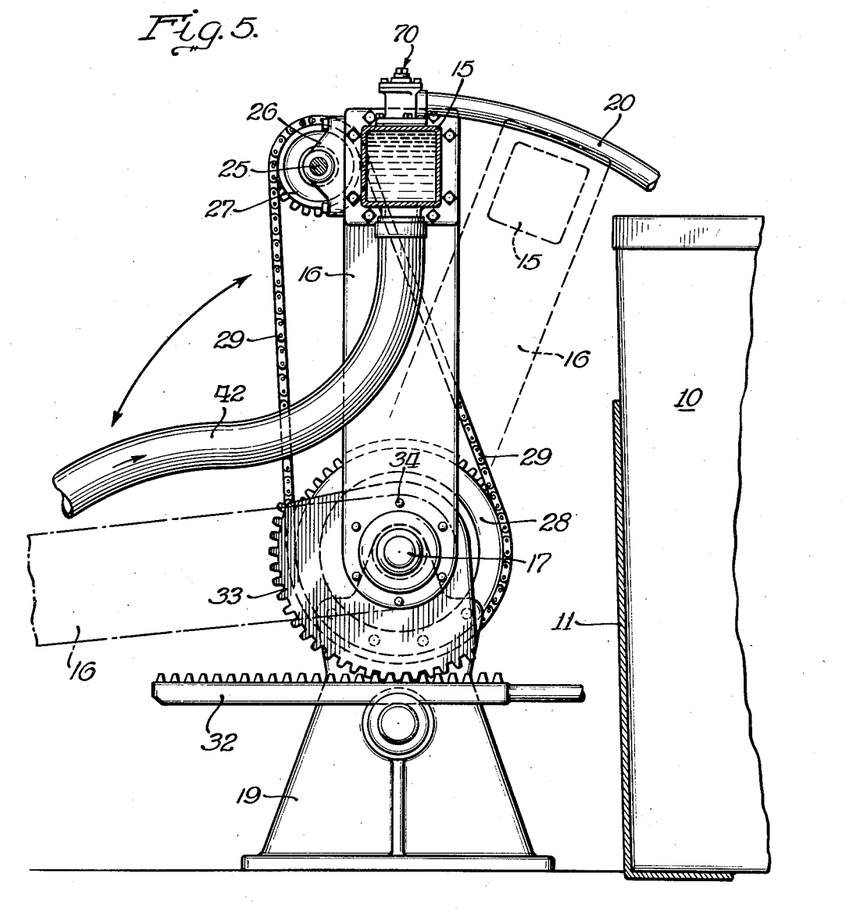
Figure 5 is a vertical cross-sectional view looking toward the drive end of the apparatus, taken along line 5—5 of Figure 7.
Figure 7:
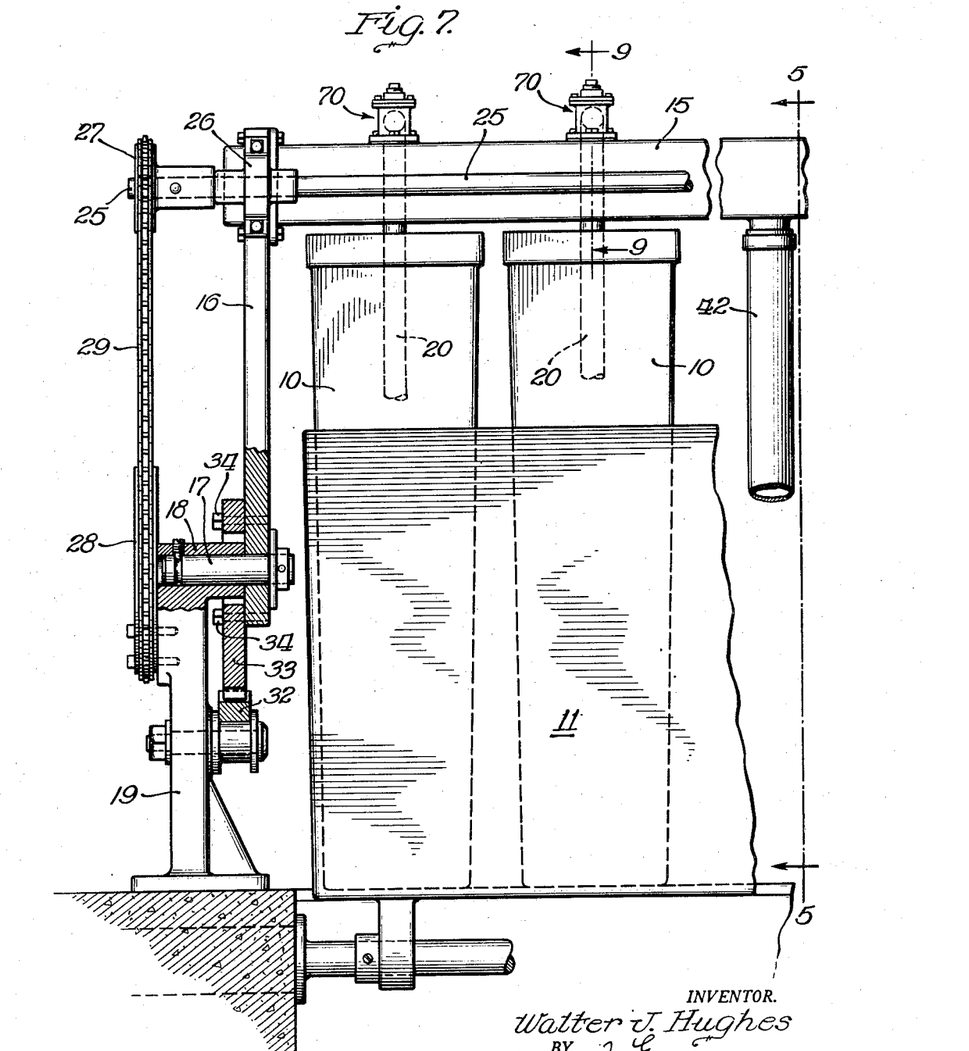
Figure 7 is a partial rear view of the apparatus partially in cross-section, showing the end of the apparatus to which the drive is applied.
Figure 8:
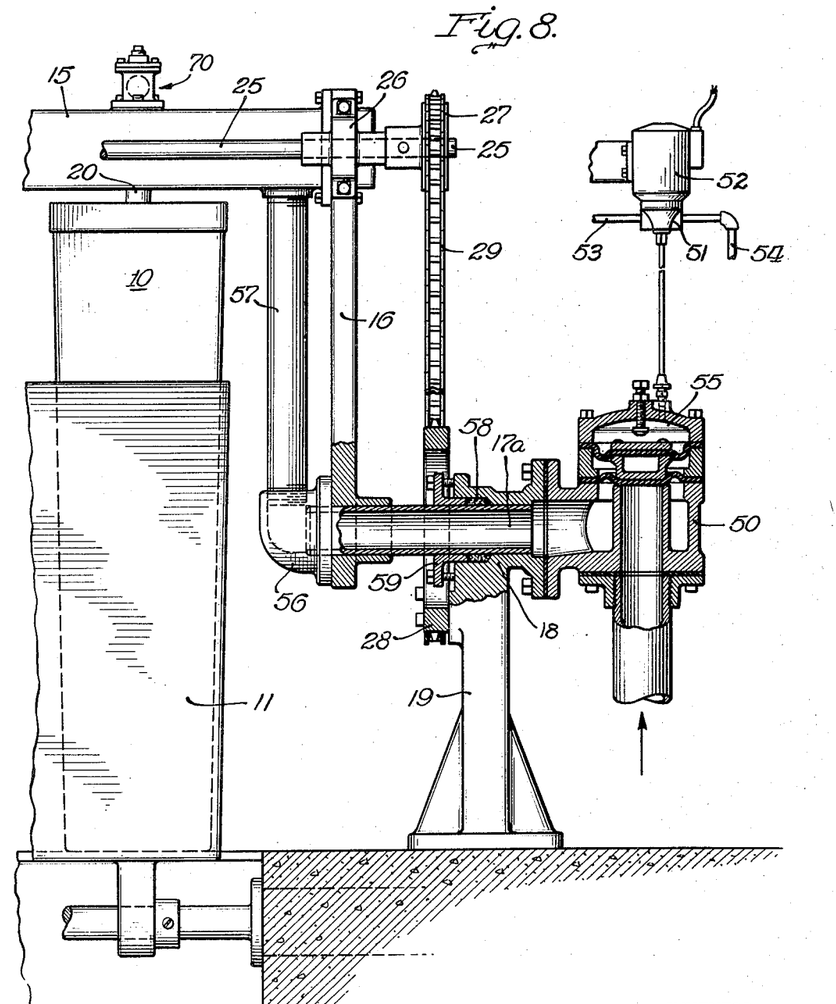
Figure 8 is a partial rear view of the apparatus, partially in cross-section, showing the end of the apparatus opposite to that of Figure 7.

Liquid, such as demineralized and degasified water, is supplied to the header 15 under pressure through a shutoff or main valve 50. Preferably the shutoff valve 50 is of the diaphragm type, such as shown in Figure 8 which closes perfectly and which can be operated hydraulically from a pilot valve such as 51 of Figure 8. From such a shutoff valve the water may be conveyed to the header by means of a flexible hose 42, as shown in Figures 5 and 7. This is a desirable way of introducing the water to the header as it eliminates the need of a gland and is inexpensive. However, use of such a hose is not always possible as there may be insufficient clearance for dumping.

An alternate means of conveying the water from the main valve to the header is shown in Figure 8. The stub shaft 17a at the end of the filler opposite the drive, which passes through the arm 16, is hollow and is rotatable in support bearing 18. One end of the stub shaft connects to the outlet passage of the shutoff valve 50 which may be mounted on the base 19 as shown. The other end of the stub shaft 17a connects to a conduit 56 which is suitably connected to the header 15 as by a conduit 57. A packing 58 and gland 59 provide a liquid tight seal for the shaft 17a permitting it to turn with the arm 16.

Figure 6:
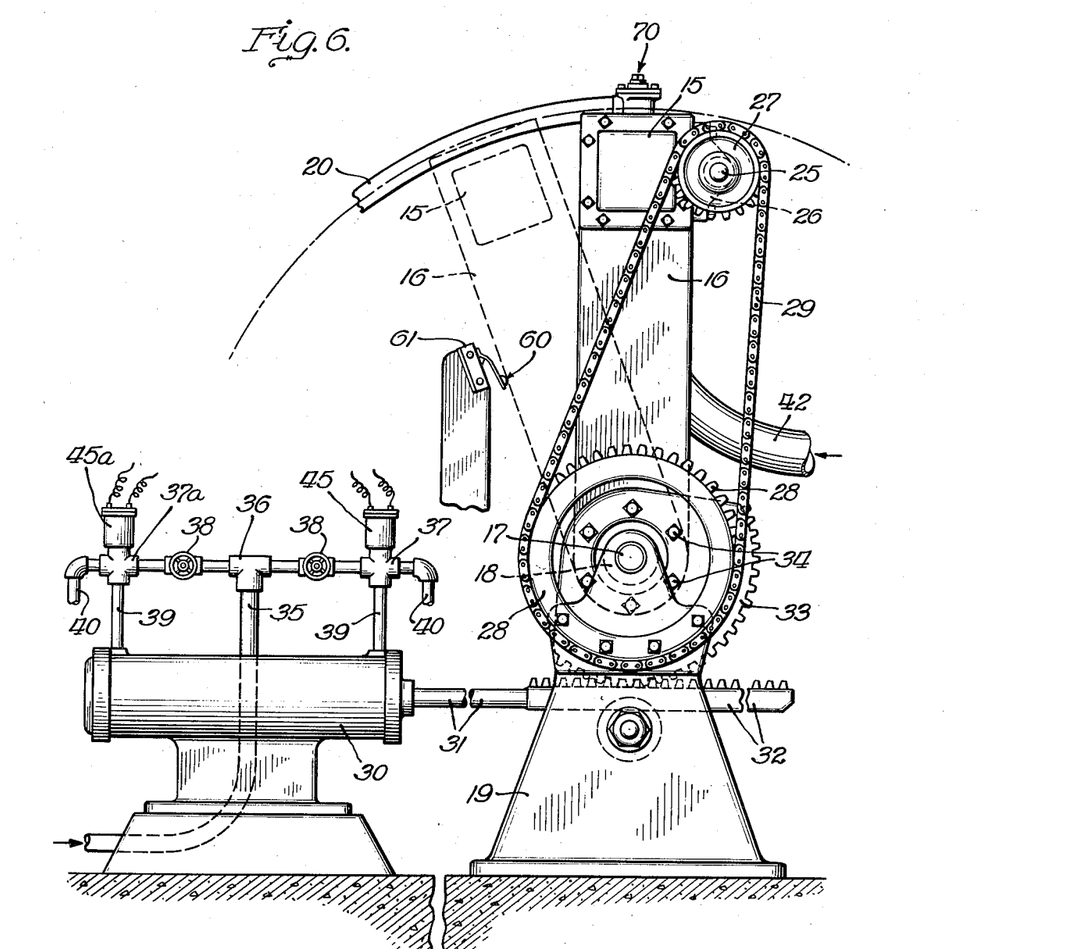
Figure 6 is an end view of the apparatus showing the far end as seen in Figure 1 and the drive means.

In Figures 5 and 6 the filler is shown in solid lines in a mid-position between the non-filling position, when the rack 32 would be completely retracted to the left (as seen in Figure 6) by energizing solenoid 45, and its filling position, indicated in dotted lines, when the rack would be fully thrust to the right by energizing solenoid 45a. Figure 5 also indicates in dotted lines the fully retracted position of arms 16. When the arm 16 reaches its filling position, it depresses the trigger 60 of an electric position switch 61 which may be mounted by any suitable means on the base 19. Closing of the switch 61 closes an electric circuit connected to the solenoid 52 of a three-way pilot valve 51 which operates the shutoff or main valve 50. (See Figure 8.) Energizing of solenoid 52 closes the pressure liquid supply line 53 of the pilot valve 51 and opens its waste line 54 thereby relieving pressure from the valve operating chamber 55, so that the main valve 50 opens to admit water to the header 15 and filler tubes 20 which, in this position of the header extend to the bottom of the cans 10.

Figures 9, 10, 11, 12:
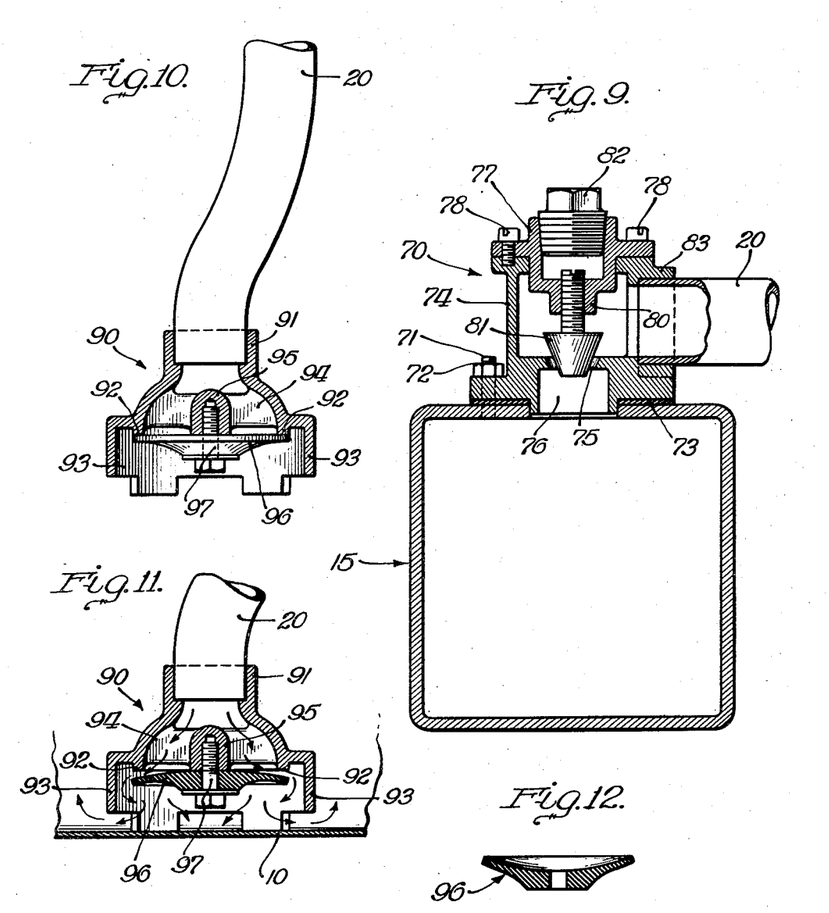
Figure 9 is a vertical cross-sectional view along line 9—9 of Figure 7.
Figures 10 and 11 are vertical sections through the foot valve of a filling tube, showing the valve in closed and open position, respectively.
Figure 12 is a vertical section through the valve disk of a foot valve in its molded shape.

Each filler tube 20 is provided with a regulating valve, generally indicated as 70 (Figures 1 and 7) to effect equal filling of all cans from the header 15 despite friction head losses and velocity head recovery in the header itself, so that the filling operation can be stopped simultaneously for all cans by a single controller operable from the liquid level in one can. Figure 9 shows a cross-sectional view of the header 15 and one regulating valve 70. The header 15 may be of any suitable cross-section, such as circular, as shown in Figure 4, or square, as shown in the other figures. With a square header the regulating valve 70 can be flanged to one side of the header as by studs 71 and nuts 72, and this construction saves shaping adaptors for the valves. A gasket 73 provides a water tight connection between the header and the valve 70. The valve body 74 is shaped to provide a valve seat 75 centrally of its inlet passage 76. A closing bonnet 77 is held to the body 74 as by screws 78 and is provided with a depending threaded center portion 80 receiving a threaded valve plug 81, and with a threaded upper portion closed by a threaded plug 82. The free end of the filler tube 20 may be sweated to the outlet flange 83 of the valve 70. By removing the plug 82, the valve of any tube can be adjusted to a proper position with respect to the seat 75 so that all filler tubes receive equal quantities of liquid.

The lower end of each filler tube is provided with a foot valve 90 which opens automatically when the shutoff valve 50 is opened and closes automatically when the shutoff valve is closed. As shown in Figures 10 and 11, the body of the foot valve 90 is fitted with a hub 91 suitable for sweating to the tube 20. The walls of the valve 90 are made very light, to eliminate weight, and are formed to provide a valve seat 92 and a circumferential skirt 93 having notched lower edges, as shown, to cooperate with the bottom of the can in gently spreading the incoming water and stilling any turbulence to prevent commotion in filling. A spider 94 across the inlet passage of the valve 90 holds a tapped center part 95. A valve disk 96 is screwed into the center part 95 as by a screw 97. The valve disk 96 is made of rubber molded in partially inverted shape as shown in Figure 12. When screwed in place in the valve body, as shown in Figure 10, the disk 96 seals the filler tube 20 against the head of the column of liquid in the tube; but when this head increases by opening of the shutoff valve 50, the disk 96 is distorted to its shape corresponding to open valve position, as shown in Figure 11. As soon as supply pressure is cut off by closing of the shutoff valve 50 the valve disk 96 returns to its valve-closing shape and foot-valve 90 is thus automatically closed when main-valve 50 is closed. The header 15 and tubes 20 thus remain filled with water when the supply is shut off and are sealed against ingress of air and egress of water in the interval until filling is resumed.

Figure 13:
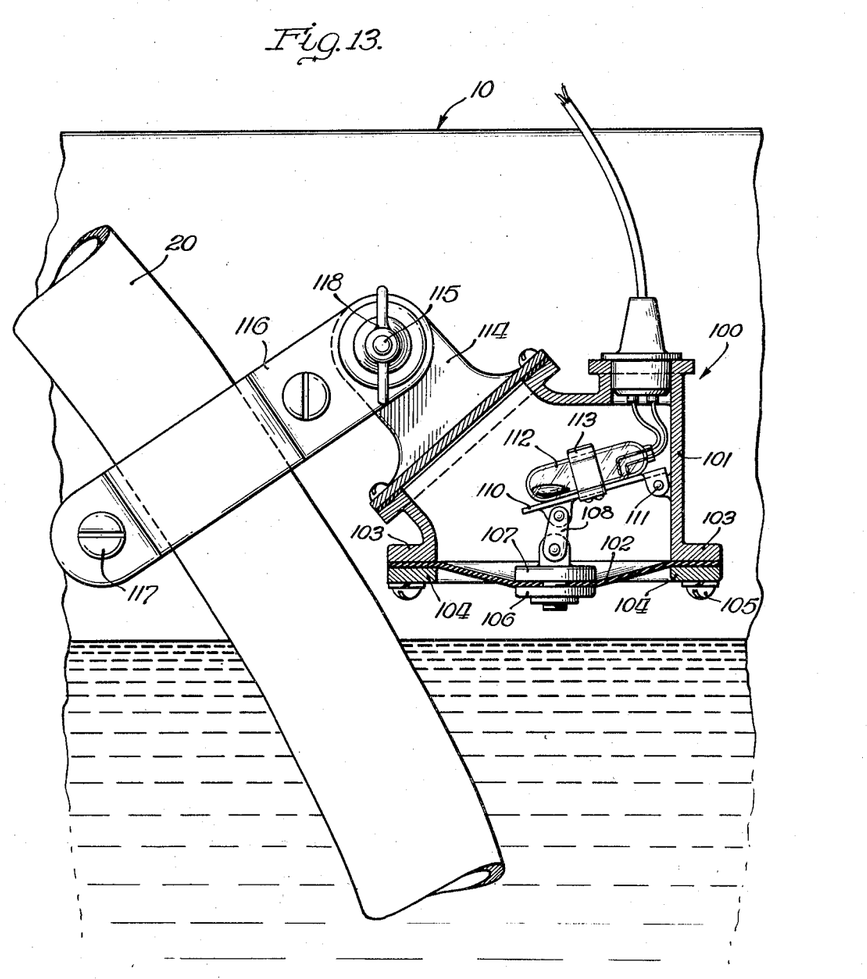
Figure 13 shows the automatic control means for closing the inlet valve and starting the retracting movement of the header.

The filling operation is stopped automatically by a liquid level controlled switch 100 adjustably mounted on one of the filler tubes 20. As shown in Figure 13 the switch 100 comprises a cylindrical body 101 closed at the bottom by a diaphragm 102 which is held between a flange 103 of the body and a flange ring 104 by any suitable means such as screws 105. Center plates 106 and 107 are clamped to the center area of the diaphragm 102. A tipping shelf 110 is pivotally supported by the switch body 101 as at 111. The diaphragm plate 107 is connected to the free end of the tipping shelf through a link 108 as shown. The shelf carries a mercury switch 112 in suitable clips 113. The contacts of the mercury switch 112 are open when the switch is in the position shown in Figure 13. A suitable bracket 114 fastened to the switch body 101 is held by a screw 115 to a clamp 116 which is slidably held to the filler tube 20 by clamp screws 117. By loosening screws 117 and sliding the clamp along the filler tube the switch 100 can be positioned to be actuated at any desired level. Wing nut 118 permits adjustment of the switch 100 to be properly leveled when the filler tubes are lowered into the cans 10.

When the liquid in the cans reaches the desired level, to which the diaphragm of the switch 100 is set, any further liquid entering the cans raises the diaphragm 102 to tip through link 108 the tipping shelf 110 and the mercury switch 112 carried thereon. Tipping of the mercury switch 112 closes its contacts. This closes a circuit which initiates the closing of the shutoff valve 50 and the retracting motion of the header 15.

Figure 14:
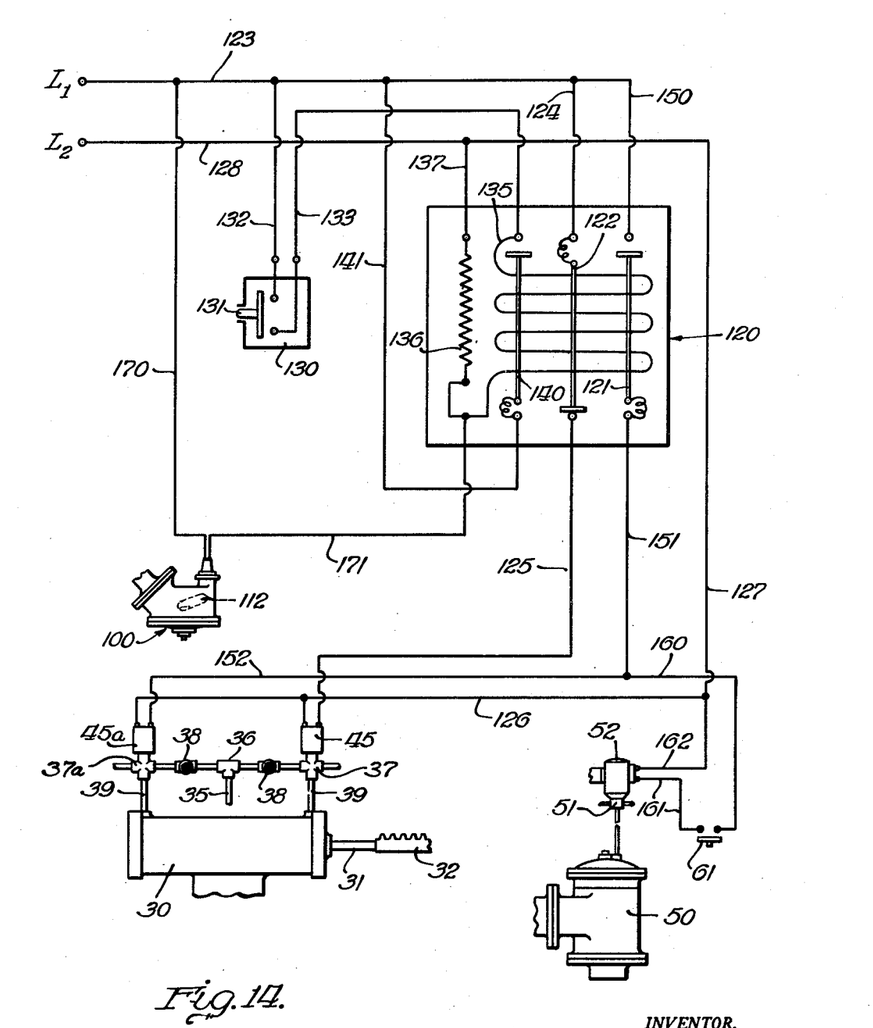
Figure 14 shows a wiring diagram for carrying out the operation of moving the filling device and opening and closing its water supply.

An electrical wiring diagram for carrying out the operations of the header and opening and closing of the shutoff valve 50 is shown in Figure 14.

A relay 120 of the three-wire control type is normally deenergized when the can filler is not in use. It has a normally open pole 121 and a normally closed pole 122. When the relay 120 is deenergized, a circuit is closed from source of power L1 through conductors 123 and 124, closed pole 122 of relay 120, conductor 125, solenoid 45 of three-way pilot valve 37 and conductors 126, 127 and 128 to source of power L2. As described above when solenoid 45 is energized pressure water is admitted to the hydraulic cylinder 30 at its right end (as seen in Figures 6 and 14) to move its piston and the rack 32 to their extreme left positions, and the header 15 is held in the fully retracted non-filling position. If in this position of the apparatus power should fail, the filler would remain in retracted position due to lack of any force to reverse the piston of the hydraulic cylinder from its left hand position.

When a bank of cans has been placed on the dump 11 for filling, the operator momentarily presses the push button 131 of a starting switch 130 to close an initiating circuit from L1 through conductors 123 and 132, the contacts of switch 130, conductor 133, the coil 135 of relay 120, resistor 136 of relay 120, and conductors 137 and 128 to L2. This closes the relay 120 whose control pole 140 closes now and keeps the coil 135 of the relay energized after the switch 130 is opened due to release of the push button, by completing a circuit from L1 through conductors 123 and 141, closed control pole 140, coil 135 and resistor 136 of relay 120, and conductors 137 and 128 to L2. When the relay 120 is thus closed, its normally closed pole 122 opens and its normally open pole 121 closes. Opening of pole 122 breaks the circuit through solenoid 45 whereupon pilot valve 37 closes its supply line 39 and opens its waste line 40 to relieve the pressure on the right end of the hydraulic cylinder 30. Closing of the normally open pole 121 closes a circuit from L1 through conductors 123 and 150, pole 121, conductors 151 and 152, solenoid 45a, and conductors 126, 127 and 128 to L2. Solenoid 45a now operates pilot valve 37a to close its waste line 40 and open its supply line 39 to admit supply pressure to the left end of the cylinder 30. This moves the rack 32 to the right and swings the arms 16 and header 15 to their filling position which is reached when the piston and rack are in their extreme right positions. The rate at which the header is moved to this position can be regulated by positioning the regulating cocks 38. When the header reaches the filling position indicated in dotted lines in Figure 6, the arm 16 depresses the trigger of the switch 61. Closing of the switch 61 completes a circuit from L1 through conductors 123 and 150, pole 121, conductors 151 and 160, the contacts of switch 61, conductor 161, solenoid 52 of pilot valve 51 and conductors 162, 127 and 128 to L2. Energizing of solenoid 52 operates pilot valve 51 as described above, to open its waste line and close its pressure line to relieve pressure in diaphragm operating chamber 55 of main valve 50 whereupon valve 50 opens under inlet pressure and admits liquid to the header through hose 42 or through the inlet connection shown in Figure 8, as the case may be. As soon as inlet pressure is acting on the foot valves they open, and filling now proceeds. If power failure occurs during filling, the shutoff valve 50 closes automatically due to solenoid 52 being deenergized and pilot valve 51 thereupon admitting pressure water to diaphragm operating chamber 55. The foot valves 90 also close automatically as soon as inlet pressure is cut off; but the filling device remains in its filling position as there is no power to move the piston of the hydraulic cylinder to the left to retract the header, the solenoid 45 being also deenergized in this case.

When the cans 10 have been filled to the desired level the mercury switch 112 is tipped as described above. This closes a circuit from L1 through conductors 123 and 170, the contacts of switch 112, conductor 171, resistor 136, and conductors 137 and 128 to L2. This circuit short circuits the coil 135 of relay 120 and the relay opens. Opening of the relay 120 opens pole 121, thereby breaking the circuits through solenoid 52 of shutoff valve 50 and through solenoid 45a of hydraulic cylinder 30. At the same time pole 122 of relay 120 closes and completes the circuit through this pole and the solenoid 45 of hydraulic cylinder 30. As solenoid 52 is deenergized the shutoff valve 50 closes. Deenergizing of solenoid 45a of the hydraulic cylinder and energizing of its solenoid 45 cuts off supply pressure on the left end of the hydraulic cylinder and provides supply pressure to its right end whereby the rack 32 is thrust to the left and the filler is swung to its retracted position.

As the header moves to the non-filling position, the mercury switch 112 is tipped to open position, thus opening the circuit through the switch. This circuit remains broken in all positions of the filler tubes 20 until the next filling has been completed and the diaphragm 102 is actuated again to reverse the switch 112.

Thus, when the filler is in the retracted position all circuits are broken except the circuit through normally closed pole 122 and solenoid 45.

It will be apparent from the description of this sequence of operations that the only manual operation involved in a complete cycle of filling operations is the pressing of the starter button. Once the initiating circuit has been closed by pressing of this button, the filler automatically completes its cycle of operation.

Many modifications of the embodiment of the invention shown and described may be made without departing from the spirit and scope of the invention. Thus, for instance, it is convenient to provide a manually operable normally closed switch in the circuit including the solenoid of the main valve to permit interruption of the filling operation without starting the retracting movement of the filling device. Accordingly, I do not wish to limit myself to the exact details of construction which have been shown for purposes of illustration but not of limitation.

I claim:

1. A device for filling in unison a bank of containers with liquid comprising a set of swingably supported filler tubes, one for each container of the bank, mechanical means connected with said tubes and movable through a predetermined angle, said tubes in one end position of movement of said mechanical means being in their filling position, with their lower ends adjacent the bottoms of said containers, and in the other end position of said mechanical means being in their non-filling position, with their lower ends retracted to clear the top rims of the containers, a conduit connected to said tubes in parallel and adapted to be connected to a source of liquid, an inlet valve controlling flow into said conduit, liquid level controlled means controlling said mechanical means for moving said tubes from filling to non-filling position and operative to close said inlet valve at the start of the retracting movement of said tubes, means controlling the said mechanical means for moving said tubes from the non-filling position to the filling position, means operated by said mechanical means and opening said inlet valve when the tubes are in their filling position, and means responsive to opening of said inlet valve to start flow from said tubes and responsive to closing of said inlet valve to stop flow from said tubes and retain the liquid therein.

2. Apparatus for filling in unison a bank of liquid containers from the bottom, comprising a header swingable about a center from a filling to a non-filling position, a plurality of filler tubes supported by, and receiving liquid from, said header and swingable therewith, a rotatably mounted torsion shaft connected to both ends of said header, mechanical means connected to one end of said header and shaft and transmitting driving force thereto to move said header and shaft through corresponding angles, and drive means for said mechanical means.

3. Apparatus for filling in unison a bank of liquid containers from the bottom, comprising a header swingable from a filling to a non-filling position, a plurality of filler tubes supported by and receiving liquid from said header and swingable therewith, a fixed support bearing for each end of said header, means for applying driving force to one end of said header and adapted to move said header through an angle corresponding to the angular distance between its filling and non-filling positions, a rotatably mounted torsion shaft connected to both ends of said header, and a drive connection between said supporting bearings and the two ends of said torsion shaft whereby said torsion shaft is driven by movement of said header through an angle corresponding to the angular movement of said header.

4. A device for filling in unison a bank of liquid containers from the bottom, comprising a movably suported header movable from a filling to a non-filling position, a bank of filler tubes, one for each container, supported by and connected to said header, an inlet connection to said header adapted to be connected to a source of liquid, a shutoff valve in said inlet connection, a valve at the lower end of each filler tube, said valve sealing said tube against the head of the column of liquid in the tube and opening when additional head is applied to said valve, means for driving said header, liquid level responsive means operative to initiate the movement of said drive means in the direction to the retracted position of said filling device and to simultaneously close said shutoff valve, manually operated means operative to initiate the movement of said drive means in the direction to the filling position of said filling device, and means actuated by said filling device when the said device reaches its filling position and controlling opening of the said shutoff valve.

5. Apparatus for filling in unison a bank of liquid containers from the bottom, comprising a bank of swingably supported filler tubes, mechanical means connected with said tubes and movable through a predetermined angle, said tubes in one end position of movement of said mechanical means being in filling position, and in the other end position being in non-filling position, a header connected to said tubes in parallel, said header being adapted to be connected to a source of liquid, a foot valve at the lower end of each tube, a main valve regulating flow into said header and controlling the operation of said foot valves, liquid level controlled means operative to close said main valve when a predetermined quantity of liquid has been admitted to the containers, and to simultaneously start the movement of said mechanical means to move said tubes to non-filling position, manually operated means operative to initiate the movement of said mechanical means to move said tubes to filling position, and means responsive to the position of said mechanical means when it reaches filling position for opening said main valve.

6. In a device for filling in unison a bank of containers by admitting liquid adjacent the bottoms of said containers, comprising a header adapted to be connected to a source of liquid, a corresponding bank of filler tubes connected to said header, swingable supporting arms at the two ends of the said header, means for applying a driving force to one of said arms for movement of the same, a rotatable torsion member supported by said arms, bearing supports for said arms, and a drive connection between said bearing supports and the two ends of said torsion member for synchronizing the movement of the ends of said header.

7. In a device adapted to fill in unison a bank of containers by admitting liquid adjacent the bottoms of said containers, a movable header adapted to be connected to a source of liquid, a bank of filler tubes corresponding to said bank of containers and connected to said header and movable therewith, a valve regulating flow of liquid to said header, valve control means including a switch responsive to the device in its filling position for opening said valve and a switch responsive to a predetermined level of liquid in the containers for closing said valve, driving means for moving said header and tubes from non-filling position to filling position and vice versa, and control means for said driving means including a switch responsive to manual instigation for movement of the device to filling position, and said liquid level responsive switch for movement of the device to the non-filling position.

8. Apparatus of the type described comprising a header having a filling and a non-filling position, a pair of arms supporting the ends of said header, said arms being swingable about a center, a bearing support for each of said arms, a shaft rotatably supported by said arms, drive means connected to one of said arms and operable to move said arm through a predetermined angle corresponding to the angular distance between said filling and non-filling positions, sprockets keyed to said shaft, one to each end thereof, a stationary sprocket mounted on each bearing support, drive chains connecting the said stationary and rotatable sprockets, a plurality of filler tubes supported by, and connected to, said header to receive liquid therefrom, a main valve controlling flow of liquid into said header, and a foot valve at the outlet portion of each of said tubes, said foot valves having valve disks of resilient material molded in valve closing shape and retaining their molded shape against the head of the column of liquid in the tubes, and being reversed by excess head due to opening of said main valve.

9. The apparatus of claim 8, including regulating valves connected with the inlet portions of said tubes.

10. In a device for filling a bank of liquid containers in unison from the bottom, a movably supported header, a bank of filler tubes corresponding to said bank of containers and connected to and supported by said header, a solenoid operated main valve regulating flow of liquid to said header, mechanical means for moving said header from filling position to non-filling position and vice versa, driving means for said mechanical means including a first solenoid operated pilot valve for moving said mechanical means towards the non-filling position and a second solenoid operated pilot valve for moving said mechanical means towards the filling position, a liquid level operated switch adapted to be closed when a predetermined quantity of liquid has been admitted to said containers, a position switch operable by said mechanical means when the header reaches its filling position, a manually operated switch, a three-wire control relay having a normally closed pole and a normally open pole, an electric circuit through said normally closed pole and the solenoid of said first pilot valve, parallel electric circuits through the normally open pole to the solenoid of said second pilot valve and to the solenoid operating said main valve, an initiating circuit through said manually operated switch and the coil of said relay for actuating said relay to open its normally closed pole and close its normally open pole, and a circuit through said liquid level operated switch, said circuit shorting said coil and deenergizing said relay.

References Cited in the file of this patent

UNITED STATES PATENTS

| | | |
|---|---|---|
| 487,384 | Belleau | Dec. 6, 1892 |
| 648,138 | Adams et al. | Apr. 24, 1900 |
| 1,092,565 | Dix | Apr. 7, 1914 |
| 1,290,358 | Roberts | Jan. 7, 1919 |
| 2,563,251 | Lonahan | Aug. 7, 1951 |